US011134605B1

(12) United States Patent
Pirani et al.

(10) Patent No.: US 11,134,605 B1
(45) Date of Patent: Oct. 5, 2021

(54) DUAL SEED METER FOR PLANTING CROPS AND IMPROVING CROP YIELDS

(71) Applicant: ADOLPH PIRANI CORPORATION, Marion, AR (US)

(72) Inventors: Mark Pirani, Marion, AR (US); Sam Pirani, Marion, AR (US)

(73) Assignee: ADOLPH PIRANI CORPORATION, Marion, AR (US)

( * ) Notice: Subject to any disclaimer, the term of this patent is extended or adjusted under 35 U.S.C. 154(b) by 0 days.

(21) Appl. No.: 17/315,928

(22) Filed: May 10, 2021

Related U.S. Application Data

(60) Provisional application No. 63/022,509, filed on May 10, 2020.

(51) Int. Cl.
| A01C 7/12 | (2006.01) |
| A01C 7/08 | (2006.01) |
| A01C 7/16 | (2006.01) |

(52) U.S. Cl.
CPC .............. *A01C 7/121* (2013.01); *A01C 7/082* (2013.01); *A01C 7/163* (2013.01)

(58) Field of Classification Search
CPC ........... A01C 7/10; A01C 7/102; A01C 7/081; A01C 7/163; A01C 7/082; A01C 7/16; A01C 7/121; A01C 7/122; A01C 7/12
See application file for complete search history.

(56) References Cited

U.S. PATENT DOCUMENTS

| 444,290 | A | * | 1/1891 | Clinton et al. | ......... | A01C 7/122 222/266 |
| 1,705,234 | A | * | 3/1929 | Brennan | ................. | A01C 7/122 222/266 |
| 1,901,301 | A | * | 3/1933 | Johnson | ................. | A01C 7/122 222/41 |
| 4,793,511 | A | * | 12/1988 | Ankum | ................. | A01C 7/046 111/77 |
| 5,170,909 | A | * | 12/1992 | Lundie | ................. | A01C 7/046 221/211 |
| 7,228,807 | B1 | * | 6/2007 | VenHuizen | ............ | A01C 7/046 111/174 |
| 9,730,379 | B2 | | 8/2017 | Wendte et al. | | |
| 10,299,425 | B2 | * | 5/2019 | Sauder | ................... | A01C 7/084 |
| 2007/0034721 | A1 | * | 2/2007 | Owenby | .............. | A01C 15/122 239/656 |
| 2008/0053350 | A1 | * | 3/2008 | Jones | ..................... | A01C 7/122 111/11 |

(Continued)

*Primary Examiner* — Jamie L McGowan
(74) *Attorney, Agent, or Firm* — Hulsey P.C.

(57) ABSTRACT

Seed meter for planting different seed varieties including back cover, disk and front cover. Back cover includes seed separation device providing first seed pool area and second seed pool area with help of the back cover. First seed pool area receives first type seeds, and second seed pool area receives second type seeds from first seed chamber and second seed chamber, respectively of a seed hopper. Disk includes at least two rows of apertures disposed in alignment with first seed pool area and second seed pool area. Disk rotates with vacuum pressure and entrains the first type seeds and the second type seeds over the apertures until apertures rotate past an area where vacuum pressure is cut off from the apertures. First type seeds and second type seeds free-fall from the disk through a discharge chute in the back cover into a seed tube for depositing into a seed furrow.

20 Claims, 13 Drawing Sheets

(56) References Cited

U.S. PATENT DOCUMENTS

| | | | | |
|---|---|---|---|---|
| 2015/0351314 | A1* | 12/2015 | Sauder | A01C 7/12 |
| | | | | 700/275 |
| 2016/0135362 | A1* | 5/2016 | Connors | A01C 7/102 |
| | | | | 701/50 |
| 2018/0000009 | A1* | 1/2018 | Baitinger | A01C 21/005 |
| 2019/0053419 | A1* | 2/2019 | Schoeny | A01C 21/005 |
| 2019/0274243 | A1* | 9/2019 | Schoeny | A01C 21/005 |
| 2019/0364718 | A1* | 12/2019 | Garner | A01C 7/201 |
| 2020/0352087 | A1* | 11/2020 | Garner | A01C 7/14 |

* cited by examiner

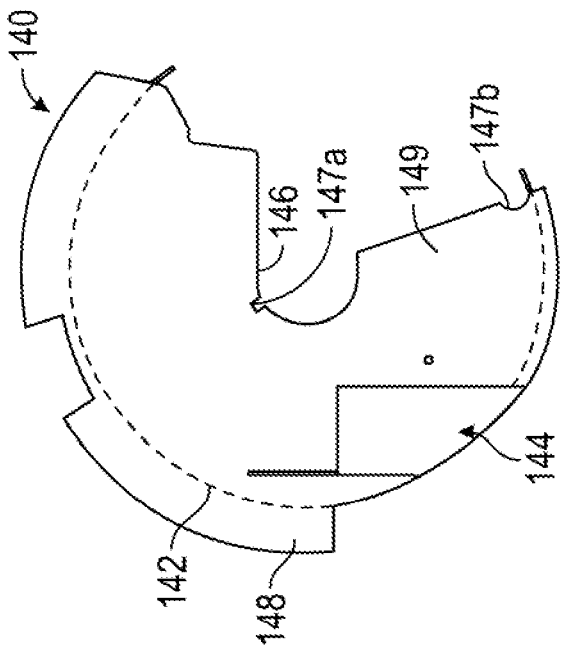
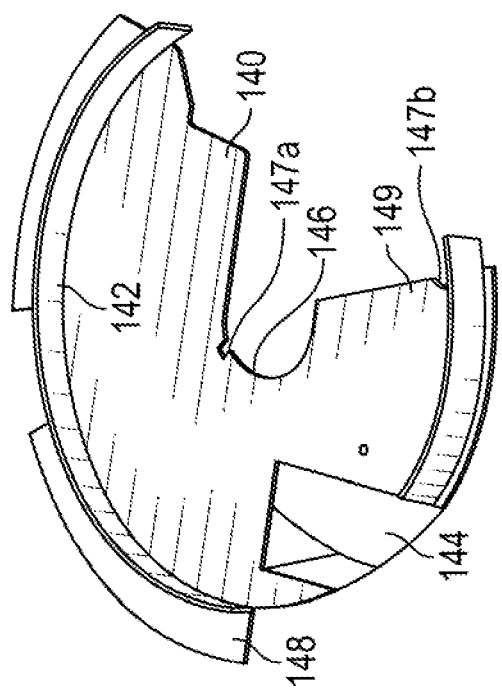
FIG. 4A
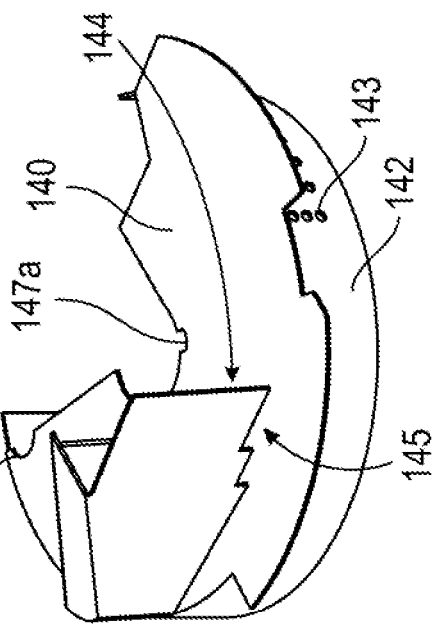
FIG. 4B
FIG. 4C

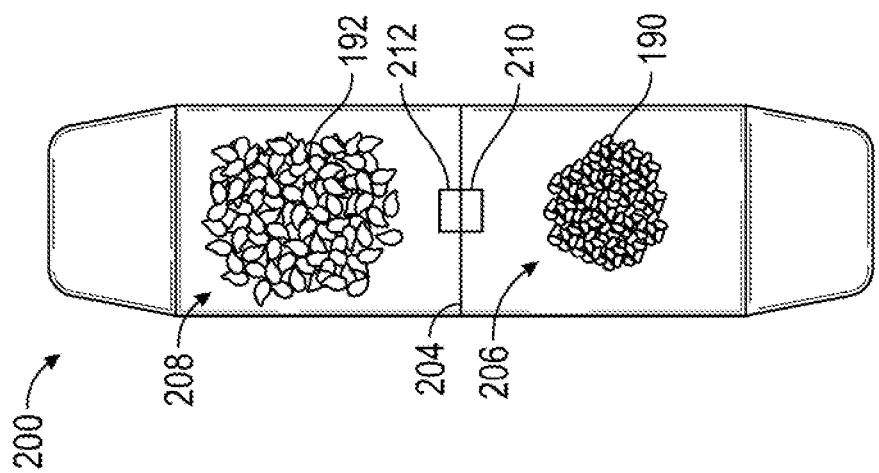
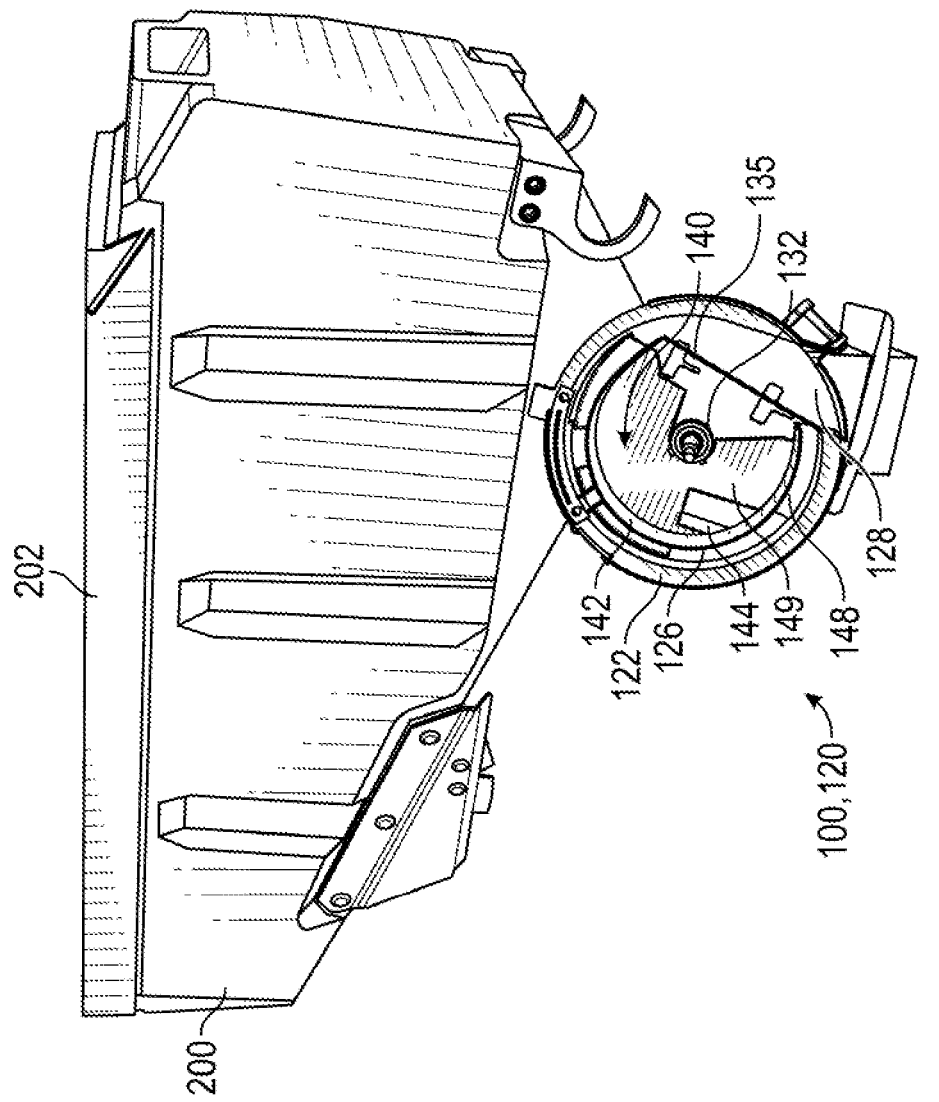

DUAL SEED METER FOR PLANTING CROPS AND IMPROVING CROP YIELDS

The present application claims the benefit of U.S. Provisional Application No. 63/022,509, filed May 10, 2020, all of which is incorporated herein by reference.

FIELD OF THE INVENTION

The present invention generally relates to seed meters. More specifically, the present invention relates to a seed meter including a seed separation device for dispensing/planting different or multiple seed varieties in a single planting pass during row-crop planting of an agricultural field.

BACKGROUND OF THE INVENTION

It is known that seed planters are used in high-production farm operations to create a trench in the soil, deposit seeds into the bottom of trench at accurate intervals, and then cover trench. Seed planters generally include seed hoppers, seed meters and seed conveyors. A seed hopper is used for holding a quantity of seeds. A seed meter is used for metering seeds. A seed conveyor is used for allowing seeds to pass through from seed meter to the soil.

As known, there are different types of seed meters, generally classified under mechanical seed meters, air seed meters and vacuum seed meters. Vacuum seed meters are generally preferred as they help to achieve higher singulation accuracy. "Singulation" accuracy is a performance benchmark that is well known for many types of seed meters and is often tested on a seed meter test stand prior to the beginning of the planting season.

An example of a vacuum seed meter is shown in FIG. 1. It should be understood that FIG. 1 shows an exploded perspective view of a conventional vacuum seed meter 10, as known in the art. Conventional vacuum seed meter 10 includes housing 20. Housing 20 includes back cover 30, disk 50, and front cover 70. Back cover 30 includes generally circular and planar back wall 32, cylindrical sidewall 34, seed inlet chute 36, and seed discharge chute 38. Back cover 30 further includes seed pool area 40 and seed discharge area 42. Back cover 30 includes rotatable baffle 44 mounted adjacent to back wall 32 and is pivotable about a central hub 46 to control the depth of seed in seed pool area 40. As can be seen, hub 46 projects forwardly from back wall 32 and includes*** a handle 48. Hub 46 is configured to rotatably receive a celled disk 50 via handle 48.

Disk 50 may include a flat disk or an offset disk. Disk 50 includes seed-side face 52 and vacuum-side face 54. Further, disk 50 includes plurality of radially spaced apertures 56 extending through disk 50. Each aperture 56 includes an indentation or concave cell 58 surrounded by it. In one example, disk 50 includes plurality of radially spaced ribs (not shown) disposed on seed-side face 52 of disk 50 that serve to agitate seeds in seed pool area 40. Further, disk 50 includes keyed central aperture 60 configured to receive handle 48. It should be understood that seed-side face 52 of disk 50 is inserted into handle 48 at keyed central aperture 60 for locking disk 50 in place with back cover 30.

Front cover 70 mounts to back cover 30 by a hinge 72. Front cover 70 includes generally circular and planar front wall 74 and substantially cylindrical sidewall 76. Front cover 70 further includes resilient seal 78 that extends around a portion of front wall 74 defining vacuum chamber 80. Seal 78 is used for sealing vacuum chamber 80 against vacuum-side face 54 of disk 50. In one implementation, seal 78 includes an arcuate segment 82 extending between about the 10:00 position to about the 6:00 position as front cover 30. It should be understood that the radius of arcuate segment 82 is slightly greater than the radius of apertures 56 in disk 50. As such, when disk 50 rotates through vacuum chamber 80 and seed pool area 40; apertures 56 are exposed to a constant negative pressure or vacuum. Further, seal 78 includes second segment 84 extending between and joins the two ends of arcuate segment 82. Second segment 84 is configured to define the edge of vacuum chamber 80. As such, when apertures 56 rotate past second segment 84, the negative pressure or vacuum is cut-off from apertures 56. Front cover 70 further includes vacuum port 86. Vacuum port 86 is provided through front wall 74 of front cover 70 with vacuum chamber 80. Vacuum port 86 is further connected to a vacuum hose (not shown) in that one end of the vacuum hose is connected to vacuum port 86 and another end is connected to a vacuum source (not shown).

In order to use vacuum seed meter 10, disk 50 mounts to hub 46 via handle 48, as shown in FIG. 2. Further, front cover 70 is connected to back cover 30 using a connector 86 provided at back cover 30.

In operation, vacuum source is used to create a negative pressure or vacuum within vacuum chamber 80, which results in a pressure differential between seed-side face 52 and vacuum side face 54 of disk 50. Pressure differential will cause seeds within seed pool area 40 (which is directly opposite the lower portion of vacuum chamber 80 on seed-side face 52 of disk 50) to entrain over apertures 56 on seed-side face 52. Seeds are entrained over apertures 56 until apertures 56 rotate past second segment 84, and negative pressure is cut-off or removed. Once the pressure differential or the negative pressure is removed, seeds free-fall under force of gravity from the face of disk 50 through discharge chute 38 and enter a seed tube (not shown). Further, seeds are directed downwardly and rearwardly through a seed tube until seeds are deposited into seed furrow (not shown).

An example of vacuum seed meter as discussed is disclosed in a U.S. Pat. No. 5,170,909, entitled, "Vacuum seed meter" ("the '909 patent"). The '909 patent discloses an air seed meter, which dispenses individual seeds supplied by a seed hopper into a furrow at a controlled rate as the meter and others like it are advanced over the ground has a generally cylindrical housing containing a rotatable seed disk. As the seed disk is rotated past a mass of seeds on one side thereof, a plurality of seed cells formed by recesses in the surface of the seed disk at one or more circumferential rows of holes adjacent the outer periphery of the seed disk mechanically accelerates and eventually captures therein individual seeds from the seed mass. The individual seeds are held within the cells by a pressure differential created by a vacuum source coupled to the inside of the housing on the opposite side of the seed disk until the cells reach a discharge area. At the discharge area, the effects of the vacuum are cut off so as to release the individual seeds from the cells for discharge through a chute at the bottom of the housing to a seed furrow below.

In these known vacuum seed meter devices, agitation of seeds within the seed mass with the accompanying mechanical acceleration and capture of individual seeds within the cells may be enhanced by providing fins on the surface of the seed disk and is facilitated by a cell configuration which has a rear wall of greater slope than the front wall of the cell. Doubling of seeds within the individual cells is minimized by limiting the size and depth of the cells relative to the seed and also by use of a relatively low-pressure differential, which is made possible by the manner in which the cells agitate, mechanically accelerate and then capture the seeds. As a result, there is no need for cumbersome and elaborate multiple seed eliminating arrangements.

Another example of seed meter is disclosed in a U.S. Pat. No. 4,793,511, entitled "Seed meter having seed disk aperture cleaning wiper and brush arrangement" ("the '511 patent). The '511 patent a seed meter in which individual seeds from a seed mass within a first chamber on a first side of a seed disk rotatably mounted within a housing are transported by at least one circumferential row of apertures within the seed disk to a separate seed discharge area within the first chamber by the reduced pressure of a vacuum source coupled to a second chamber within the housing and on the opposite side of the seed disk from the first chamber, a brush and wiper arrangement mounted within a third chamber within and sealed from the second chamber and located opposite the seed discharge area bears against the second side of the seed disk to aid in dislodging and expelling debris from the apertures in the seed disk. The brush and wiper arrangement includes at least one circular brush rotatably mounted within the third chamber and a spring arrangement for biasing the circular brush and an adjacent circular band against the second surface of the seed disk at the at least one row of apertures. Also included is a relatively thin, generally planar wiper blade having a straight edge disposed against the second side of the seed disk and a leaf spring mounting the wiper blade and operative to bias the wiper blade against the second side of the seed disk at the at least one row of apertures.

Yet another example of seed meter is disclosed in a U.S. Pat. No. 10,299,425, entitled "Seed meter" ("the '425 patent". The '425 patent discloses a seed meter for an agricultural planter in which the seed disc is rotatably mounted within a seed meter housing. As the seed disc rotates, the apertures in the disc rotate along a seed aperture path through a horizontally adjacent seed pool area. The seed disc includes cavities disposed along the seed aperture path to agitate the seeds in the seed pool area. A singulator having multiple co-planar singulator surfaces is biased against the seed side surface of the seed disc.

Although seed meters discussed above include features that improve the singulation of seeds, they have few limitations. For instance, seed meters of the above type can only be used for planting one type/variety of seeds. For instance, the '909 patent allows for planting one type of seed, as it receives only one type of seed in the seed furrow. Further, the seed mater in '425 patent is designed to plant one type of seed. However, modern farming practices strive to utilize site-specific planting prescriptions that use two or more (different) seed varieties in a given field to increase yields. As such, the above discussed seed meters cannot be used for planting different seed varieties.

Some of the prior art disclosures tried to solve the above-identified problem. One such example is disclosed in a U.S. Pat. No. 9,730,379, entitled "Multiple seed-type seed meter" ("the '379 patent"). The '379 patent discloses that a seed meter is provided for planting multiple types of seed and rapidly switching between the types being planted in a single planting pass of a planting session of row-crop planting. The seed meter has a split seed meter reservoir with a pair of seed meter chambers flanked by or next to a pair of seed disks. Activation and deactivation of the seed disks within the seed meter are synchronized to selectively deliver one type of seed from one of the seed meter chambers for delivery out of a single seed tube of the seed meter, which may provide absolute and instantaneous on-the-go seed switching within a single row from each seed meter.

It should be understood that constructional features of two disks as disclosed in the '379 patent are too complex. The seed meter disclosed in '379 patent allows for absolute and instantaneous switching of seeds being planted in a single planter pass. Further, '379 patent allows to change the varieties in the field indicating that the seed meter configuration changes back and forth between seed varieties at different locations in the field. However, the seed meter cannot be used to plant two different types of seed together in a "hill" in the same furrow.

Therefore, there is a need in the art to provide an improvement in the structure/functions, and use of seed meters for planting two or more types of seeds without having to add additional or complex constructional features. The present disclosure makes possible a number of the needed solutions to current state of the art.

SUMMARY OF THE INVENTION

It is an object of the present invention to provide a seed meter that avoids the drawback of known seed meters.

It is another object of the present invention to provide a seed meter for dispensing different types of seeds in a single planting pass into a seed furrow.

It is another object of the present invention to provide a seed meter for dispensing different types of seeds together with desired seed spacing.

It is yet another object of the present invention to provide a seed meter to plant two different types of seed together in a "hill" in the same furrow.

It is yet another object of the present invention to provide a seed meter to plant multiple varieties of seeds together in the same trench or together in a "hill" without having to change back and forth between varieties at different locations in the field.

It is yet another object of the present invention to provide a seed meter to plant two or more varieties of seeds together in the same place.

In order to achieve one or more of the objects, the present invention provides a seed meter including a seed separation device removably mounted to a back cover of the seed meter.

In one technical feature of the present invention, a seed meter includes a back cover, a disk and a front cover. Back cover includes first seed inlet chute in communication with a first seed chamber of a seed hopper. Further, the back cover includes a seed separation device. The seed separation device includes a perpendicular wall provided at a distance from the sidewall of the back cover. The perpendicular wall forms a gap between the sidewall and the center of back cover. The seed separation device includes a second seed inlet chute inserted into the first seed inlet chute. The second seed inlet chute is configured to be in communication with a second seed chamber of the seed hopper.

First seed chamber stores the first type seeds and second seed chamber stores second type seeds. Due to gravity, the first type seeds flow down the first seed chamber and into the first seed pool area (formed between the wall of seed separation device and sidewall of back cover) through first seed inlet chute. Similarly, second type seeds flow down the second seed chamber and into the second seed pool area (formed at the wall of seed separation device) through the second seed inlet chute.

Further, the back cover receives the disk. The disk includes at least two rows offset or radially aligned apertures, one row of apertures aligned with the first seed pool area and other row of apertures aligned with the second seed pool area. Specifically, the first row of apertures is disposed in alignment with the first seed pool area. As such, when the disk rotates through the first seed pool area; the first row of apertures entrain the first type seeds onto the seed-side face of disk. Similarly, the second row of apertures are disposed in alignment with the second seed pool area. As such, when the disk rotates through the second seed pool area, the second row of apertures entrain the second type seeds onto the seed-side face of the disk.

Front cover connects to the back cover by a hinge. The front cover includes a vacuum port connected to a vacuum source. In operation, the disk rotates within the hollow interior of the back cover. The vacuum source is operated to create a negative pressure or vacuum within the vacuum chamber formed in the front cover. This results in creation of negative pressure in the disk. Negative pressure causes the first type seeds in the first seed pool area and the second type seeds in the second seed pool area to be entrained over the first apertures and the second apertures, respectively until the first apertures and the second apertures rotate past an edge of the vacuum chamber. After the first type seeds and the second type seeds rotate past the edge of vacuum chamber, the negative pressure is cut off and the first type seeds and the second type seeds free-fall under the force of gravity from the face of the disk. The first type seeds and the second type seeds fall through the discharge chute in the back cover and the enter a seed tube. Further, the first type seeds and the second type seeds are directed downwardly and rearwardly through the seed tube until the first type seeds and the second type seeds are deposited into the seed furrow.

In another implementation, the disk encompasses three rows of apertures for planting two different types of seeds. In such an implementation, two of the three rows of apertures are aligned with first seed pool area, and another row of apertures is aligned with the second seed pool area. As such, when the disk rotates, two rows of the apertures entrain the first type seeds and another row of apertures entrains the second type seeds. When the apertures rotate past the edge of the vacuum chamber, the negative pressure is cut off and two seeds of first type seeds and one seed of second type seeds are discharged from the seed meter.

In one advantageous feature of the present invention, the seed separation device removably mounts to the back cover of an existing seed meter. As such, the seed meter can be used for dispensing different types of seeds or only one type of seed by selectively using the seed separation device in the back cover.

In another advantageous feature of the present invention, the seed meter allows two types of seeds to be put in the same furrow together in a hill drop style. Further, two or three seeds of two different varieties can be closely aligned together in the seed furrow without having to change back and forth between varieties of seeds at different locations in the field.

Features and advantages of the invention hereof will become more apparent in light of the following detailed description of selected embodiments, as illustrated in the accompanying FIGURES. As will be realized, the invention disclosed is capable of modifications in various respects, all without departing from the scope of the subject matter. Accordingly, the drawings and the description are to be regarded as illustrative in nature.

BRIEF DESCRIPTION OF THE DRAWINGS

The present subject matter will now be described in detail with reference to the drawings, which are provided as illustrative examples of the subject matter so as to enable those skilled in the art to practice the subject matter. Notably, the FIGURES and examples are not meant to limit the scope of the present subject matter to a single embodiment, but other embodiments are possible by way of interchange of some or all of the described or illustrated elements and, further, wherein:

FIGS. 4A, 4B, 4C, 4D, 4E, 4F, and 4G illustrate a side perspective, a rear view, a rear side perspective, a front view, a side view, a top view and another side view, respectively of a seed separation device; in accordance with one embodiment of the present invention;

FIG. 9A illustrates a side perspective view of the seed meter i.e., the back cover connected to a seed hopper; in accordance with one embodiment of the present invention;

FIG. 9B illustrates a top view of the seed hopper 200; in accordance with one embodiment of the present invention;

It will be noted that throughout the appended drawings, like features are identified by like reference numerals.

DETAILED DESCRIPTION OF THE EMBODIMENTS

Figure 1:
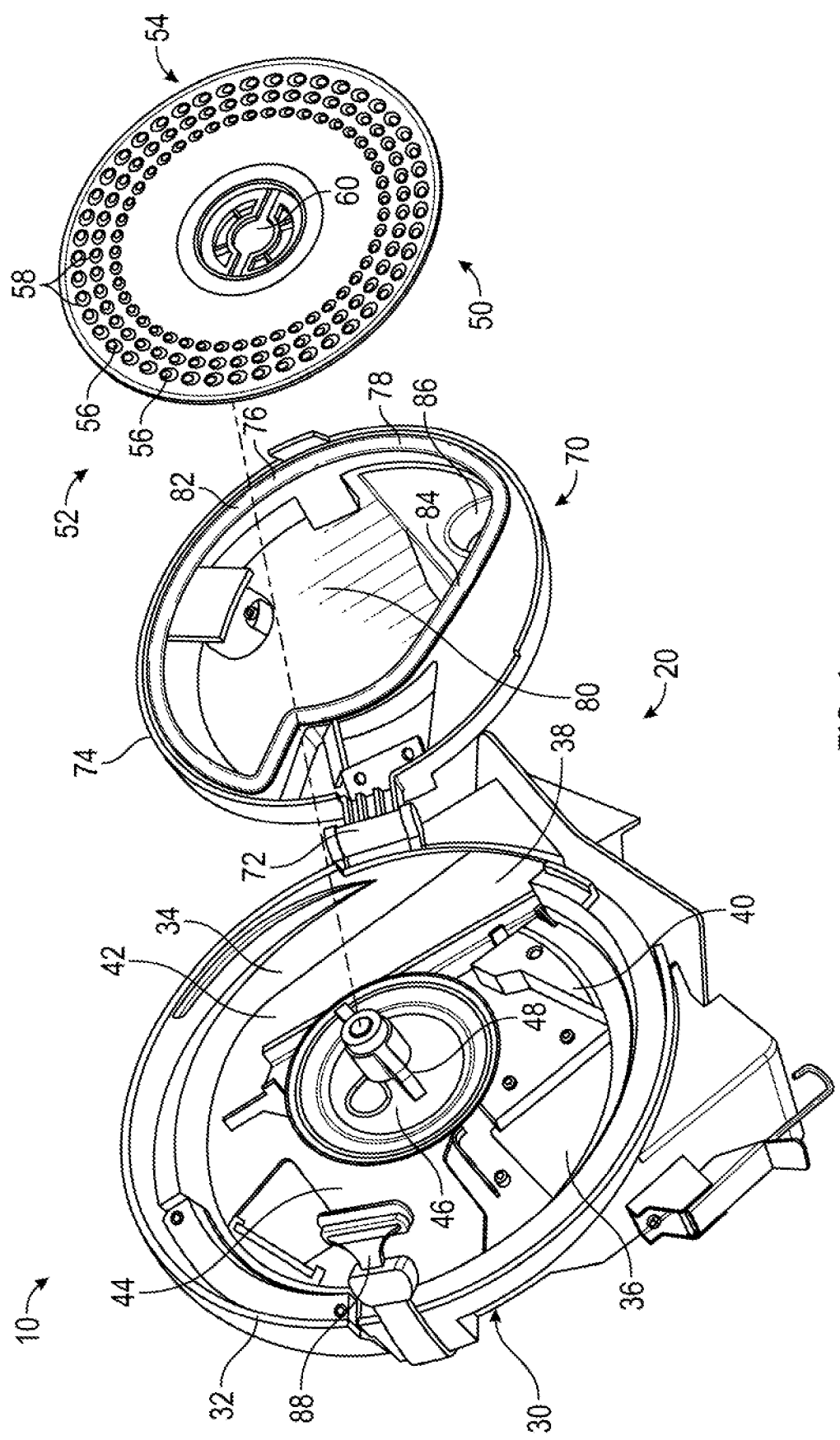
FIG. 1 illustrates an exploded perspective view of a conventional vacuum seed meter, in accordance with prior art.
Figure 2:
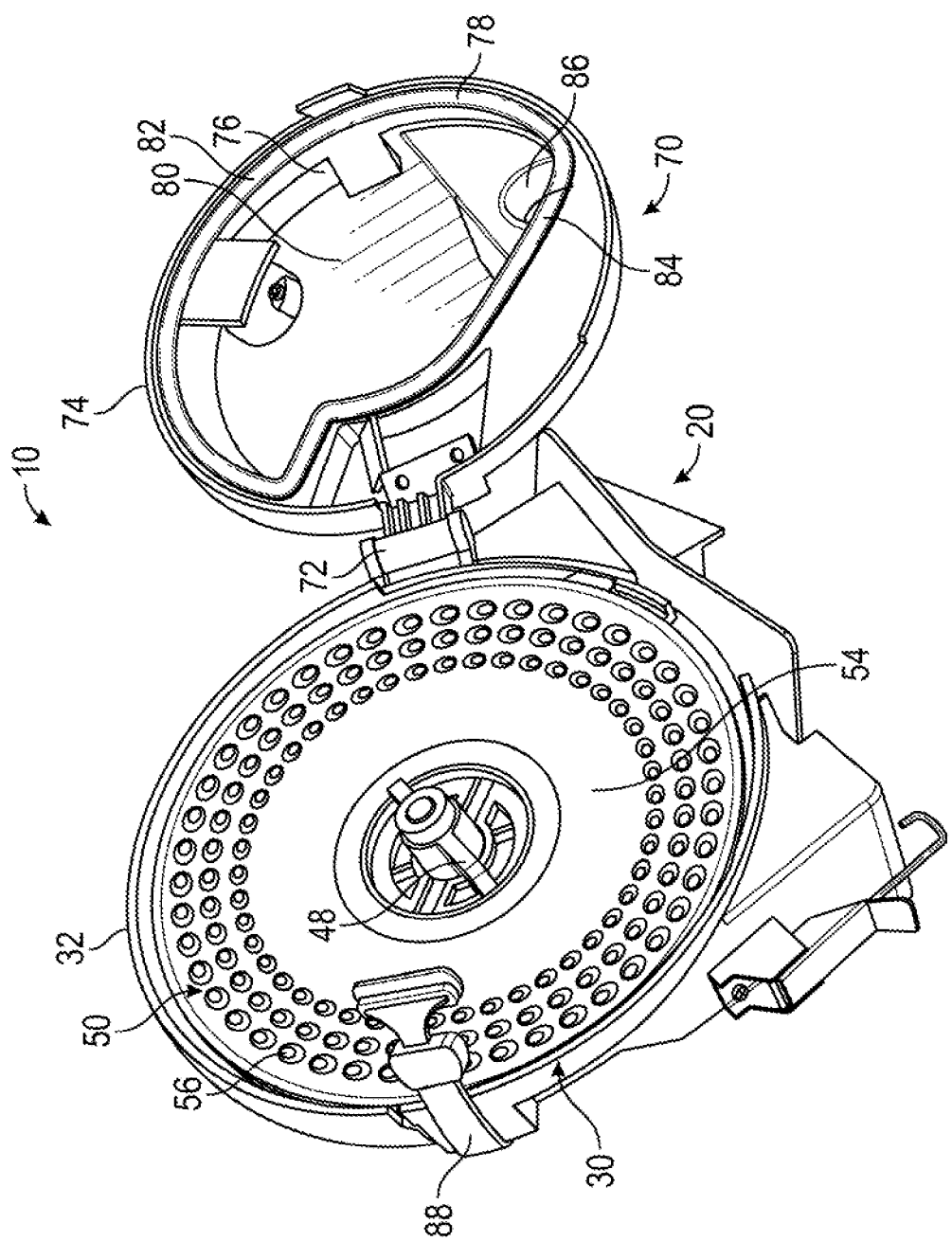
FIG. 2 illustrates the vacuum seed meter in which a disk is mounted to a back cover, as in the prior art.

The detailed description set forth below in connection with the appended drawings is intended as a description of exemplary embodiments in which the presently disclosed subject matter can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed seed meter. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed seed meter.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification or to be ascribed an uncommon or special meaning unless explicitly set forth as such. Further, the present subject matter encompasses present and future known equivalents to the known components referred to herein by way of illustration.

Although the present disclosure provides a description of a seed meter including a seed separation device, it is to be further understood that numerous changes may arise in the details of the embodiments of this seed meter. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

It should be understood that the present invention describes a seed meter for planting different seed varieties. The seed meter includes a back cover, a disk and a front cover. The back cover includes a seed separation device for providing a first seed pool area and a second seed pool area with the help of the back cover. The first seed pool area receives first type seeds and the second seed pool area receives second type seeds from a first seed chamber and a second seed chamber, respectively of a seed hopper. The disk includes at least two rows of apertures disposed in alignment with the first seed pool area and the second seed pool area. The disk rotates with vacuum pressure and entrains the first type seeds and the second type seeds over the apertures until the apertures rotate past an area where the negative (vacuum) pressure is cut off from the apertures. Further, the first type seeds and the second type seeds free-fall from the disk through a discharge chute in the back cover into a seed tube for depositing into a seed furrow.

In another embodiment, the disk includes three rows of apertures, two rows disposed in alignment with first seed pool area and another row disposed in alignment with second seed pool area.

Figure 3:
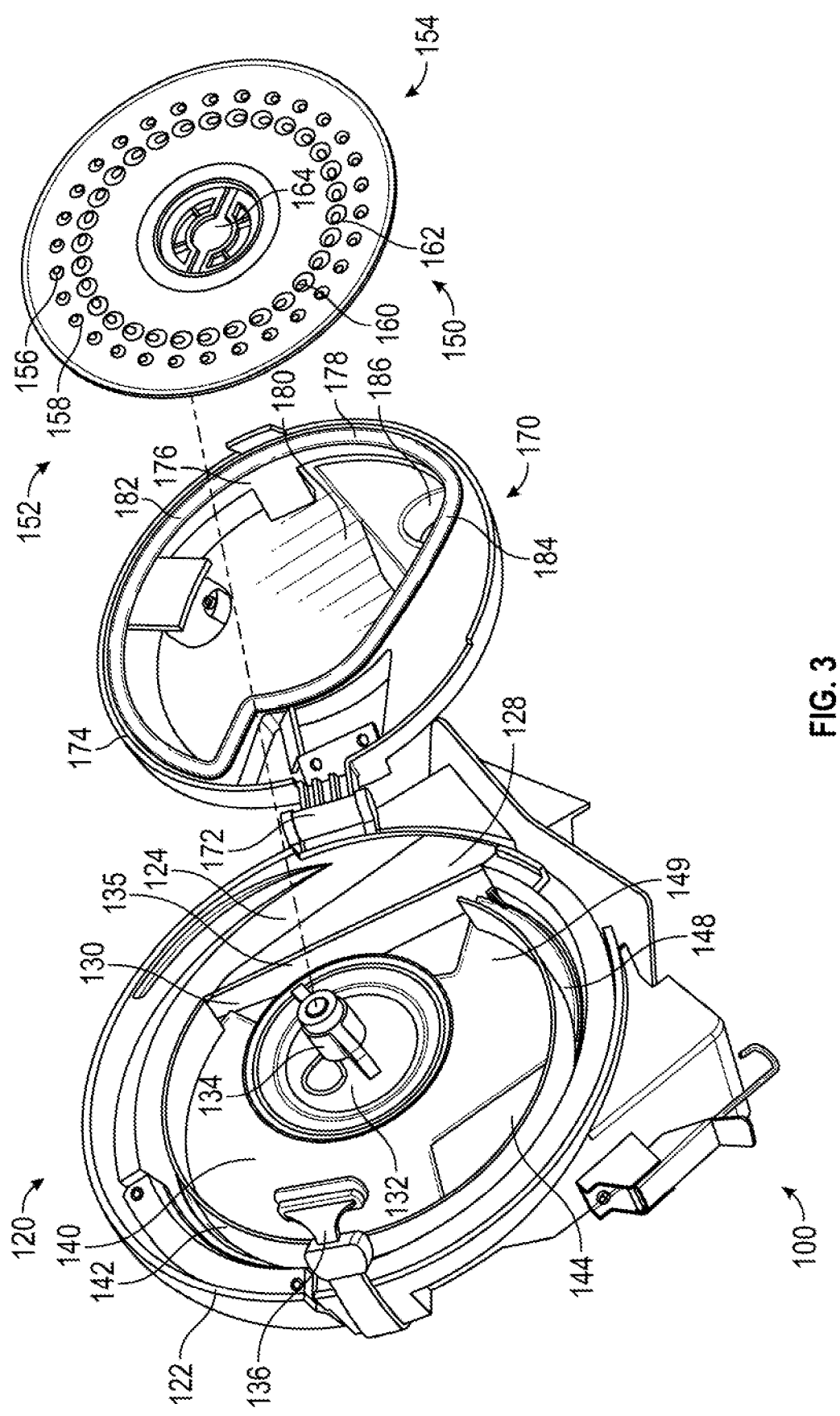
FIG. 3 illustrates an exploded perspective view of a seed meter, in accordance with one embodiment of the present invention.

Various features and embodiments of the seed meter are explained in conjunction with the description of FIGS. 3-13. In one embodiment, the present invention discloses a seed meter for planting different seed varieties together in a single planting pass during row-crop planting of an agricultural field. FIG. 3 shows an exploded perspective view of seed meter 100, in accordance with one embodiment of the present invention. Seed meter 100 includes back cover 120, disk 150, and front cover 170.

Back cover 120 includes circular and planar back wall 122, cylindrical sidewall 124, first seed inlet chute 126, and seed discharge chute 128. Further, back cover 120 includes seed discharge area 130 in proximity to cylindrical sidewall 124. Back cover 120 includes central hub or simply hub 132. Hub 132 projects forwardly from back wall 122 and includes handle 134. Hub 132 is configured to rotatably receive disk 150 via handle 134. Further, back cover 120 includes isolation brush 135 for separating seed discharge area 130 and second seed pool area 149 (explained in subsequent paragraphs). In one implementation, back cover 120 includes connector 136 for connecting front cover 170 to back cover 120.

Figure 6:
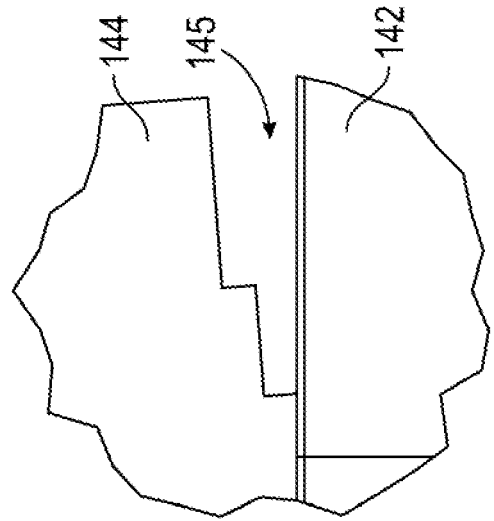
FIG. 6 illustrates a feature of chute having step-structure.
Figure 7:
FIG. 7 illustrates a feature of cut-section in the hub receiving area.
Figure 4G:
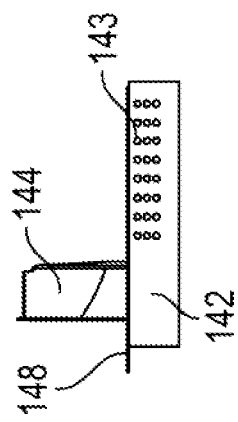
Figure 5:
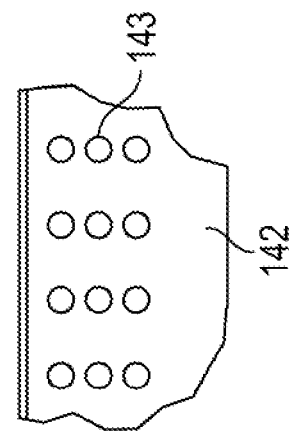
FIG. 5 illustrates a feature of wall having holes.
Figure 4D:
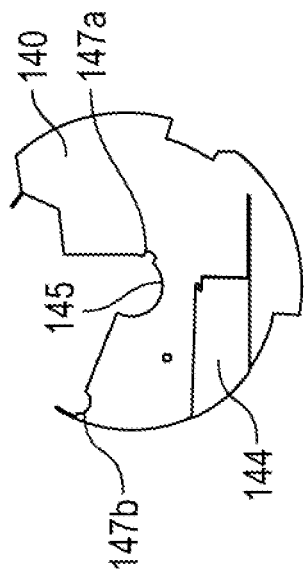
Figure 4E:
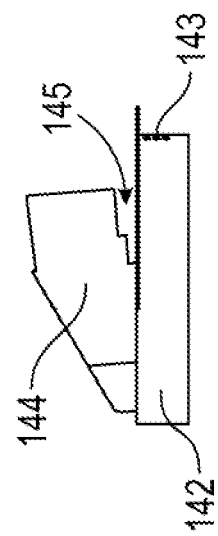
Figure 4F:
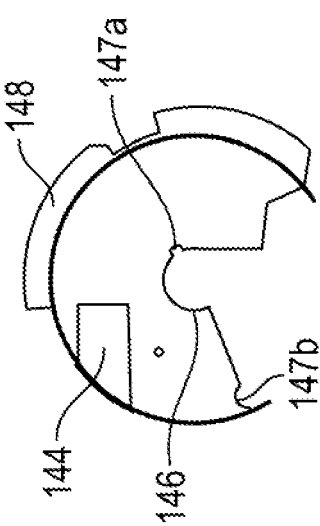
Figure 8A:
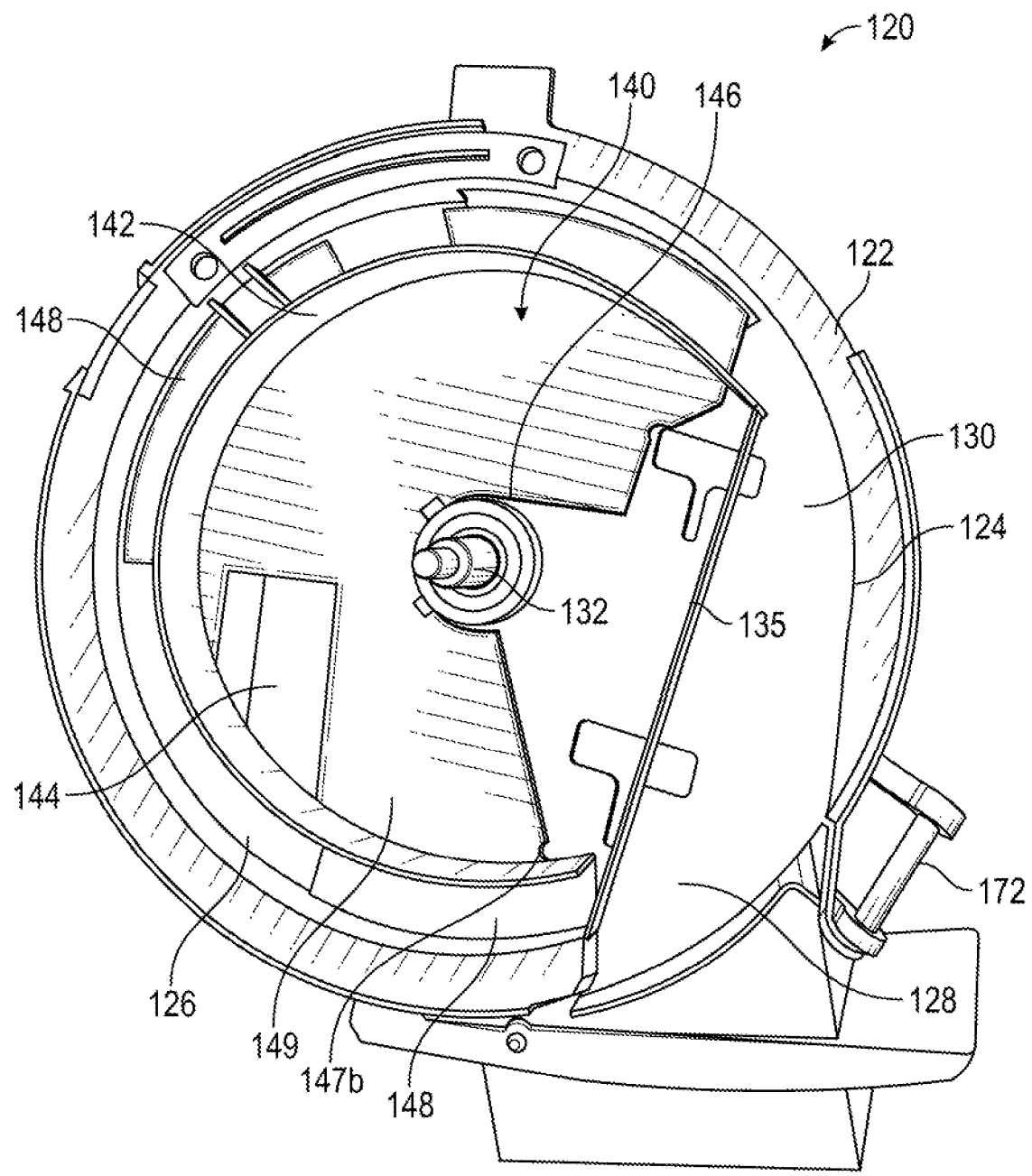
FIGS. 8A, 8B, and 8C illustrate a front perspective view, a side perspective view, a bottom side perspective view, respectively of the seed separation device being mounted to a back cover; in accordance with one embodiment of the present invention.
Figure 8B:
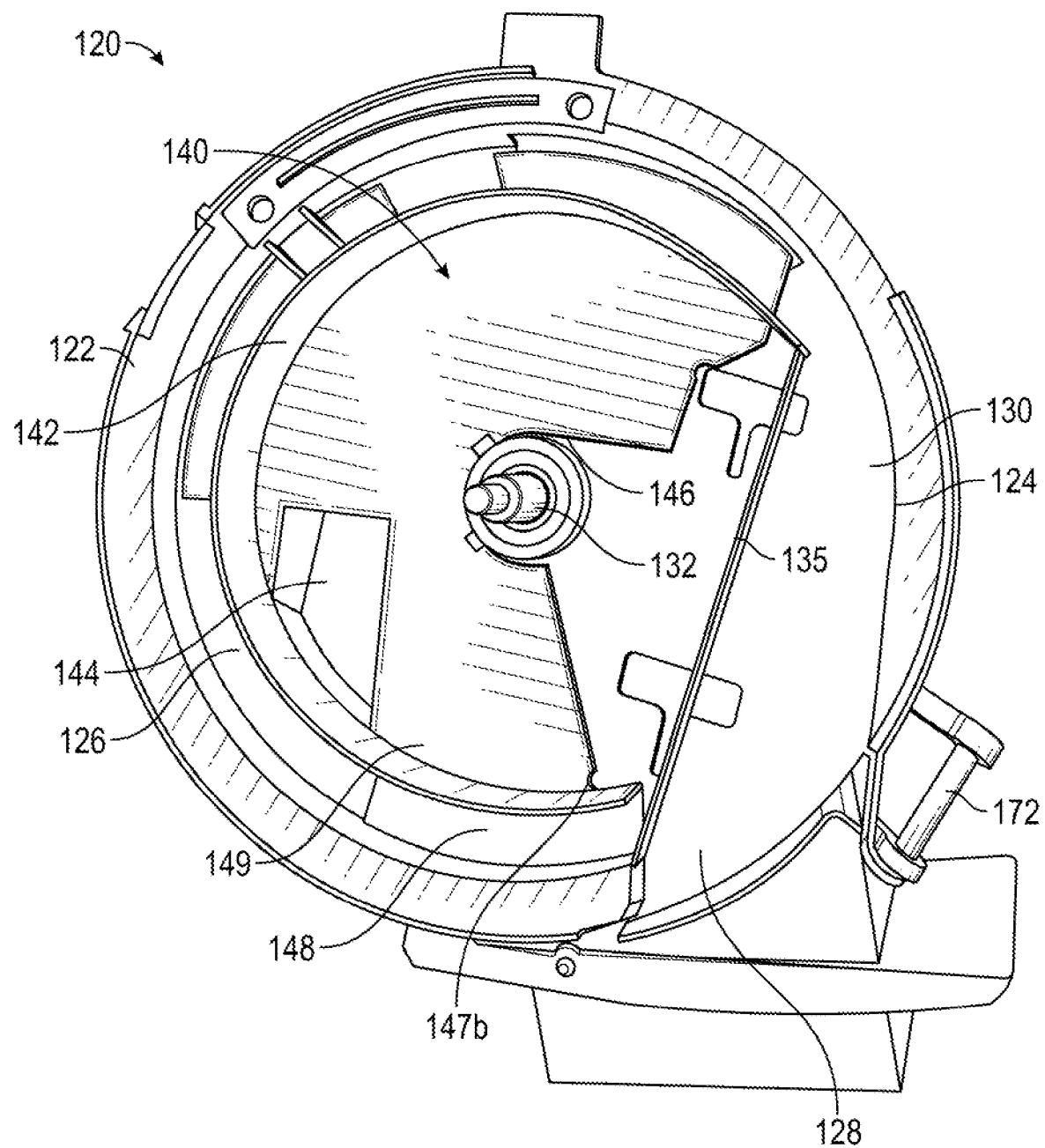
Figure 8C:
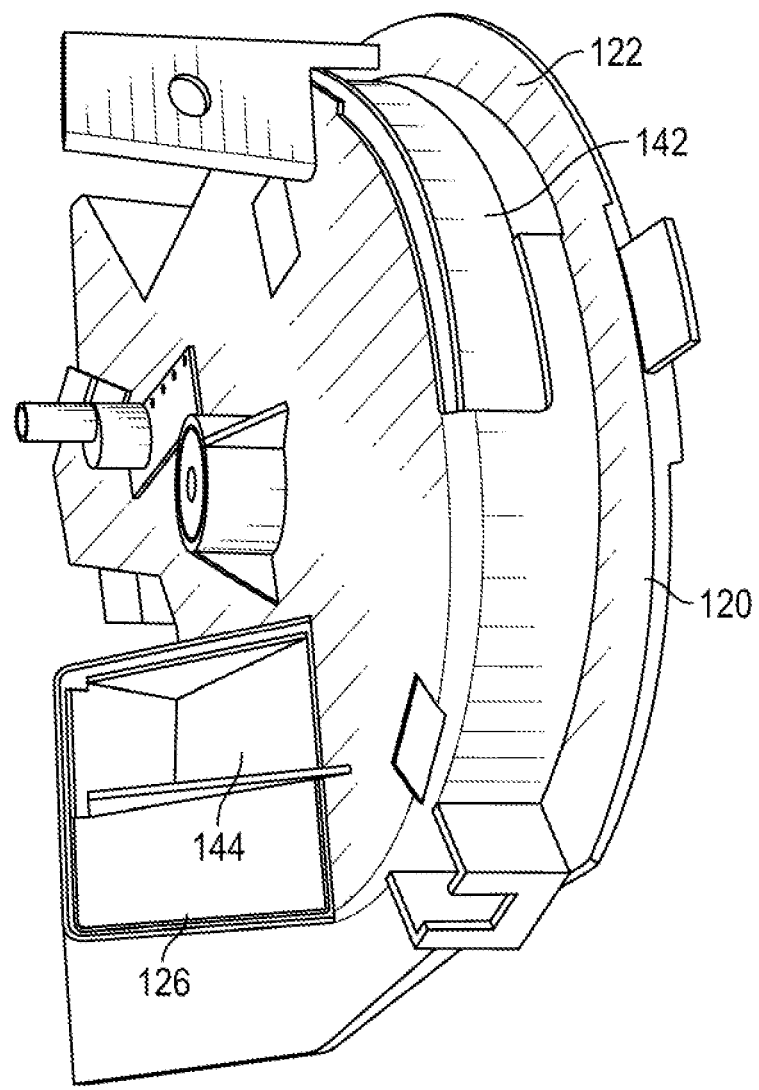

In accordance with one embodiment of the present invention, back cover 120 includes seed separation device or dual chamber device or dual seed drop meter 140. Seed separation device 140 provides a material made up of metal, plastic or any other suitable material. Referring to FIGS. 4A through 8C, the constructional features of seed separation device 130 are explained. It should be understood that FIGS. 4A, 4B, 4C, 4D, 4E, 4F, and 4G show a side perspective, a rear view, a rear side perspective, a front view, a side view, a top view and another side view, respectively of seed separation device 140. Further, FIGS. 8A, 8B and 8C show front perspective view, side perspective view, and rear side perspective, respectively of seed separation device 140 mounted to back cover 120. As can be seen in at least FIGS. 4A, 4B, 4C, 4D, and 4F, seed separation device 140 comes in a substantial semi-circular shape or circular plate with cut-pie shape. Seed separation device 140 comes in a relatively flat structure to sit at the planar portion of circular and planar back wall 122. Seed separation device 140 includes wall 142 provided along and close to edge of the semi-circular shape of seed separation device 130. As can be seen in at least FIGS. 4A, 4E, 4G and 8B, wall 142 is raised perpendicular to the flat side of seed separation device 140. In other words, wall 142 projects forwardly from the relatively flat structure of seed separation device 140. It should be understood that wall 142 positions at a distance from the edge of semi-circular shape to about the height of circular and planar back wall 122. Wall 142 includes holes 143 as shown in FIGS. 4C and 4G. Holes 143 allow to distribute the vacuum created in seed meter 100 (explained in the later part of the description). Further, seed separation device 140 includes second seed inlet chute 144 provided at the rear end of seed separation device 140 defining an interior from rear side of seed separation device 140, as shown in FIGS. 4B, 4C, 4D, 4E, 4F and 4G. Second seed inlet chute 144 raises from seed separation device 140 (FIGS. 4E and 4G). In implementation, second seed inlet chute 144 encompasses step-groove 145 for easy mounting it to first seed inlet chute 126. FIG. 6 shows the feature of second seed inlet chute 144 having step-groove 145. In the current embodiment, second seed inlet chute 144 inserts into first seed inlet chute 126 to separate second seed inlet chute 144 from first seed inlet chute 126, as shown in FIG. 8C. It should be understood that second seed inlet chute 144 inserts into first seed inlet chute 126 to create a separate entry point to seeds from seed hopper placed above seed meter 100 such that seeds are made to enter into first seed inlet chute 126 and second seed inlet chute 144 separately. Further, seed separation device 140 includes hub receiving area 146 provided in a substantial semi-circular shape for receiving hub 132. It should be understood that seed separation device 140 removably mounts to back cover 120 using known mechanisms such as fastener, for example. In one example, hub receiving area 146 includes U-shaped cut-section 147*a* as shown in FIG. 7. U-shaped cut-section 147*a* helps to connect handle 134 to hub receiving area 146. Further, seed separation device 140 includes semi-circular cut section 147*b* that helps seeds to fall in the seed furrow.

Now referring to FIGS. 8A, 8B and 8C, seed separation device 130 mounted to back cover 110 can be seen. When seed separation device 130 mounts to back cover 120, seed separation device 130 facilitates in creation of first seed pool area 148, and second seed pool area 149, as shown in FIGS. 8A and 8B. As specified above, wall 142 positions at a distance from the edge of semi-circular shape of seed separation device 140 to about the height of circular and planar back wall 122. The gap created between the wall 142 and circular and planar back wall 122 creates first seed pool area 148. Inner side of wall 142 creates second seed pool area 149 to receive seeds through second seed inlet chute 144. Here, first seed pool area 148 receives one type of seeds through first seed inlet chute 126 and second seed pool area 149 receives another type of seeds from second seed inlet chute 144.

In order to supply two different type/varieties of seeds, seed meter 100 connects to seed hopper 200 as shown in FIG. 9A. Specifically, back cover 120 of seed meter 100 connects to seed hopper 200 using known mechanisms. As known, seed hopper 200 includes lid or cover 202 used for covering the top portion of seed hopper 200. Now referring to FIG. 9B, top view of seed hopper 200 without lid 202 is shown. In accordance with one embodiment of the present invention, seed hopper 200 divides into two chambers with introduction of separation plate 204 in seed hopper 200. As such, seed hopper 200 divides into first seed chamber 206 and second seed chamber 208. In one example, lid 202 divides into two parts, forming first seed chamber 206 and second seed chamber 208. Further, seed hopper 200 includes first aperture 210 at the bottom end of separation plate 204 in first seed chamber 206. Similarly, seed hopper 200 includes second aperture 212 at the bottom end of separation plate 204 in second seed chamber 208. In the present embodiment, first seed chamber 206 stores one type of seeds, say first type seeds 190, and second seed chamber 208 stores another type of seeds, say second type seeds 192. It should be understood that first type seeds 190 and second type seeds 192 are used herein to indicate that they are of different type or different varieties. In other words, different types of seeds i.e., first type seeds 190 and second type seeds 192 include not only different varieties of the same plant species, but also different seed products.

Different seed products may include seeds of different species, coated and uncoated seeds, such as insecticide coated and non-insecticide coated seeds. Different seed products may also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide tolerant seed, or other different products. For example, different types of seeds may include corn, cotton, sorghum, sugar beets, soy beans, sunflower and so on. Alternatively, different types of seeds may indicate seeds of different size, shape and surface texture. For example, first type seeds 190 may include cottonseeds, and second type seeds 192 may include bean seeds. In another example, first type seeds 190 may include herbicide-tolerant seeds, and second type seeds 192 may include non-herbicide tolerant seeds of the same seed type.

Figure 10:
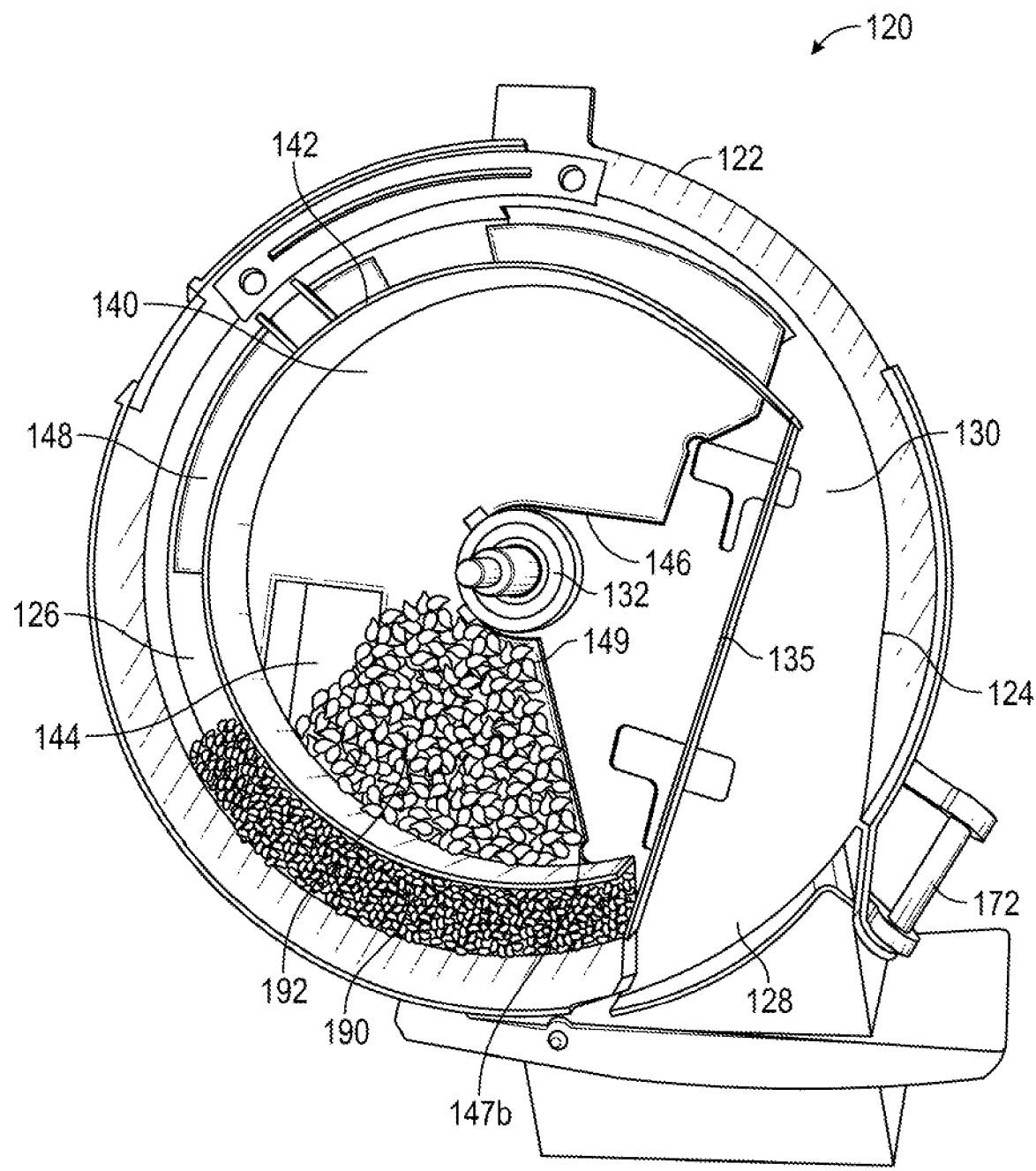
FIG. 10 illustrates a feature in which first type seeds and second type seeds received at a first seed pool area and a second seed pool area, respectively; in accordance with one embodiment of the present invention.
Figure 11:
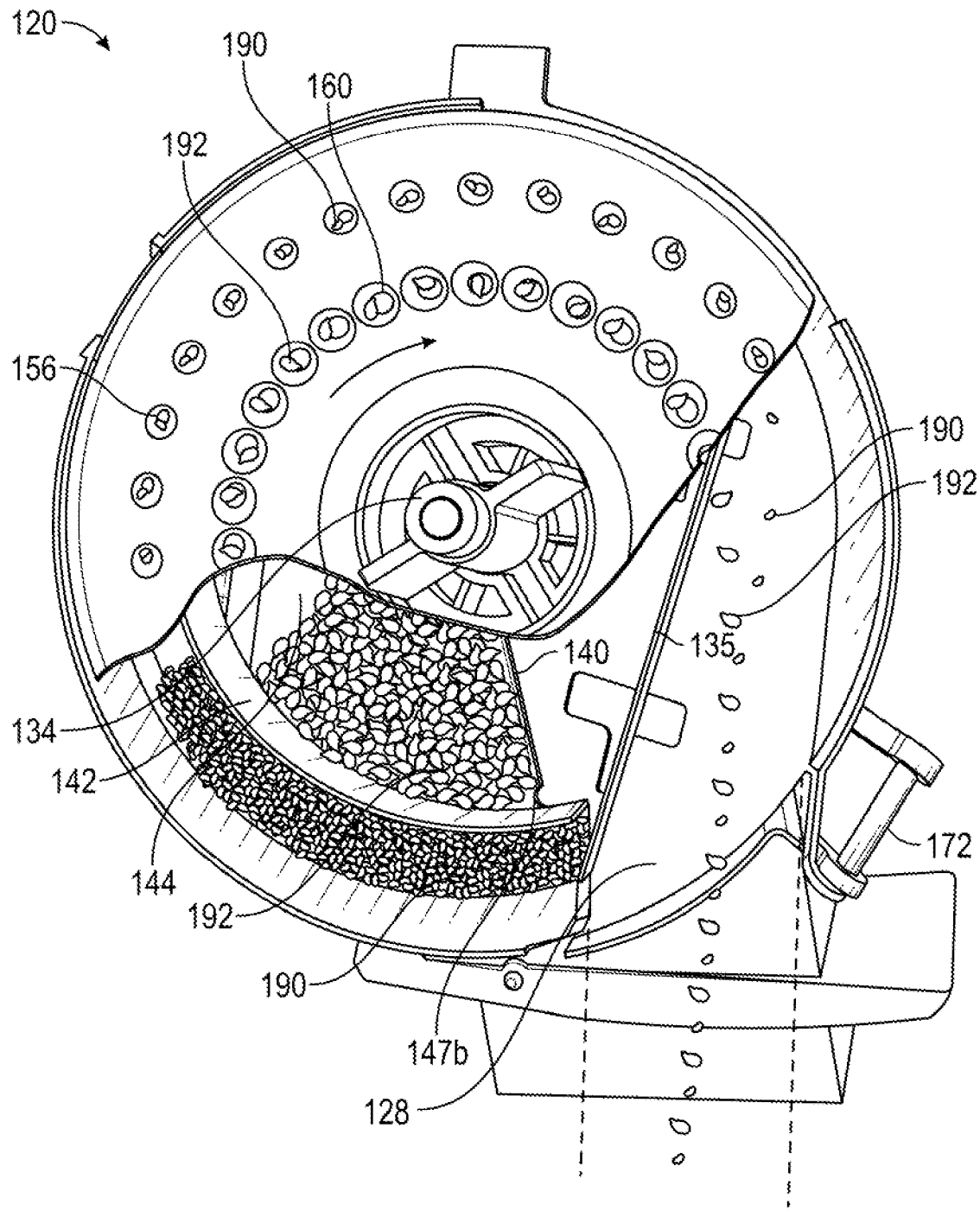
FIG. 11 illustrates a front view of a portion of the seed meter of FIG. 3 showing the first type seeds in the first seed pool area and the second type seeds in the second seed pool area therein which are picked up by the disk and then released from the disk for discharge from the seed meter, in accordance with one embodiment of present invention.

Now referring to FIGS. 9B and 10, it should be understood that first seed inlet chute 126 provides communication/channel between first seed chamber 206 and first seed pool area 148. Further, second seed inlet chute 144 provides communication/channel between second seed chamber 208 and second seed pool area 149.

Due to the constructional features of seed separation device 140 and separation plate 204; first type seeds 190 flow down from first seed chamber 206 through first aperture 210 to seed meter 100 i.e., to back cover 120 and into first seed pool area 148 due to gravity. Similarly, second type seeds 192 flow down from second seed chamber 208 through second aperture to seed meter 100 i.e., to back cover 120 and into second seed pool area 149 due to gravity.

Referring to FIG. 10, first type seeds 190 and second type seeds 192 received at first seed pool area 148 and second seed pool area 149, respectively are shown. Based on the above, a person skilled in the art will understand that with the introduction of seed separation device 140 in back cover 120, and separation plate 204 in seed hopper 200, different types of seeds can be collected separately at the bottom of back cover 120 and seed separation device 140. In the FIGS. 9B and 10 illustrated herein, the size of first type seeds 190 are shown as being smaller than second type seeds 192 to differentiate them from one another. However, a person skilled in the art will appreciate that such an illustration is provided only for indicating seeds of different types and should not be construed in a limited sense.

Now referring back to FIG. 3, seed meter 100 includes disk 150. Disk 150 might be provided as an offset disk or as a flat disk or a relatively flat disk with less pronounced offset. The current disclosure is explained considering that disk 150 is an offset disk. However, a person skilled in the art will appreciate that any other disk that is known in the art can be used with seed meter 100 described herein without deviating from the scope of the present invention.

In the current embodiment, disk 150 includes seed-side face 152 and vacuum-side face 154. In other words, seed-side face 152 indicates the side of disk 150 facing back cover 120 (or seeds 190, 192 in back cover 120 and/or seed separation device 140). Vacuum-side face 154 indicates another side of disk 150 facing front cover 170. Disk 150 includes plurality of equally radially spaced first apertures 156, each having an indentation or concave cell 158. Further, disk 150 includes plurality of equally radially spaced second apertures 160, each having an indentation or concave cell 162. In the current embodiment, first apertures 156 are disposed in alignment with first seed pool area 148. Similarly, second apertures 160 are disposed in alignment with second seed pool area 149. Further, disk 150 includes keyed central aperture 164 configured to receive handle 134. In other words, seed-side face 152 of disk 150 inserts into handle 134 at keyed central aperture 164 for locking disk 150 in place with back cover 120.

In the current disclosure, it is presented that disk 150 includes apertures i.e., first apertures 156 and second apertures 160 disposed in two rows offset or radially aligned, however a person skilled in the art will understand that apertures might be provided with three rows for planting two different types of seed. In such an implementation, seed meter 100 can be used to plant three different seeds, two (2) of one variety and one of other variety. An embodiment of disk including three rows of apertures is explained in subsequent paragraphs of the description.

Further, seed meter 100 includes front cover 170, as can be seen FIG. 3. Front cover 170 attaches to back cover 120 by hinge 172. Front cover 170 includes generally circular and planar front wall 174 and substantially cylindrical sidewall 176. Further, front cover 70 includes resilient seal 178 that extends around a portion of front wall 174 defining vacuum chamber 180. Seal 178 seals vacuum chamber 180 against vacuum-side face 154 of disk 150. Further, seal 178 includes an arcuate segment 182 extending between about the 10:00 position to about the 6:00 position as front cover 130. It should be understood that the radius of arcuate segment 182 is slightly greater than the radius of first apertures 156 in disk 150. As such, when disk 150 rotates through vacuum chamber 180, first seed pool area 148 and second seed pool area 149; first apertures 156 and second apertures 160 are exposed to constant negative pressure or vacuum. Further, seal 178 includes second segment 184 extending between and joins the two ends of arcuate segment 182. It should be understood that second segment 184 defines an edge of vacuum chamber 180. As such, when first apertures 156 and second apertures 160 rotate past second segment 184, the negative pressure or vacuum is cut-off from first apertures 156 and second apertures 160. Front cover 170 further includes vacuum port 186. Vacuum port 186 is further connected to vacuum hose (not shown) in that one end of the vacuum hose is connected to vacuum port 86 and another end is connected to vacuum source (not shown).

The operation of seed meter 100 can now be considered. As specified above, first type seeds 190 and second type seeds 192 flow down from first seed chamber 206 and second seed chamber 208 into first seed pool area 148 and second seed pool area 149, respectively. Now referring to FIG. 11, front view of a portion of seed meter 100 of FIG. 3 showing first type seeds 190 in first seed pool area 148 and second type seeds 192 in second seed pool area 149, which are picked up by disk 150 and then released from disk 150 for discharge from seed meter 100 is shown, in accordance with one embodiment of the present invention. In operation, disk 150 rotates within the hollow interior of back cover 120. Further, vacuum source is operated to create negative pressure or vacuum within vacuum chamber 180, which results in a pressure differential between seed-side face 152 and vacuum side face 154 of disk 150. It should be understood that the pressure differential will cause first type seeds 190 in first seed pool area 148 and second type seeds 192 in second seed pool area 149 (which is directly opposite the lower portion of vacuum chamber 180 on seed-side face 152 of disk 150) to entrain over first apertures 156 and second apertures 160, respectively on seed-side face 152 of disk 150. It should be understood that each of first aperture 156 and second aperture 160 entrains only one seed firmly and other seeds drop back into first seed pool area 148 and second type seeds 192 in second seed pool area 149, respectively. First type seeds 190 and second type seeds 192 are entrained over first apertures 156 and second apertures 160 until they rotate past second segment 184 and the negative pressure or pressure differential is cut off or removed. Once the pressure differential is removed, first type seeds 190 and second type seeds 192 free-fall under the force of gravity from the face of disk 150, they fall through discharge chute 128 and enter a seed tube (not shown). Further, first type seeds 190 and second type seeds 192 are directed downwardly and rearwardly through the seed tube until first type seeds 190 and second type seeds 192 are deposited into seed furrow (not shown).

The rate at which seeds are dispensed i.e., spacing of first type seeds 190 and second type seeds 192 (seed spacing) in the seed furrow can be configured using known art. For example, if the farmer wishes to plant one first type seeds 190 for a single second type seed 192, then disk 150 including second apertures 160 with a wider gap between them might be considered. In another example, if the farmer wishes to plant two first type seeds 190 for a single second type seed 192, then disk 150 including second apertures 160 with a wider gap between them might be considered. Alternatively, monitoring devices (not shown) such as sensors might be used for controlling the rate of discharge of first type seeds 190 and second type seeds 192 from seed meter 100 so that the proper seed spacing is achieved. It should be understood that two varieties of seeds might be planted together in the same furrow by controlling the spacing of the current "hill" type planting from as low as 2 inches apart to as far as 2 feet apart. As such, two different varieties of seeds might be planted in each "hill".

When seed meter 100 is implemented with seed planters (not shown), seed meter 100 can be used to dispense different types of seeds of different size and surface characteristics accurately. In other words, two different types of seeds can be planted at desired locations with accurate seed spacing along the length of seed furrow to increase yields. This is beneficial because it allows the farmers to plant a higher population to help with emergence but terminate the non-herbicide resistant seeds after emergence to create a desired lower population.

Figure 12B:
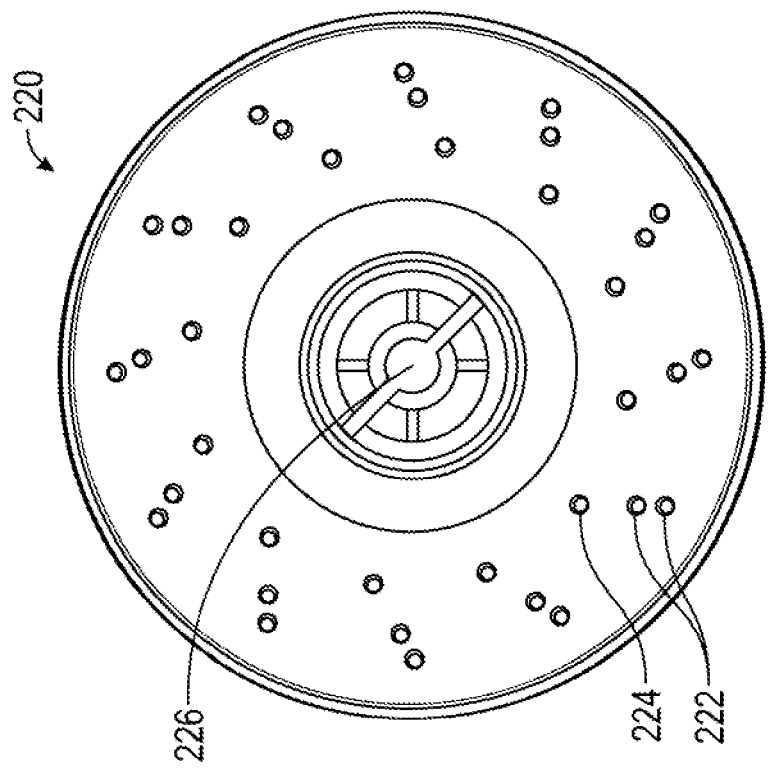
FIGS. 12A and 12B illustrate a top and bottom view of a disk, in accordance with another embodiment of the present invention.
Figure 12A:
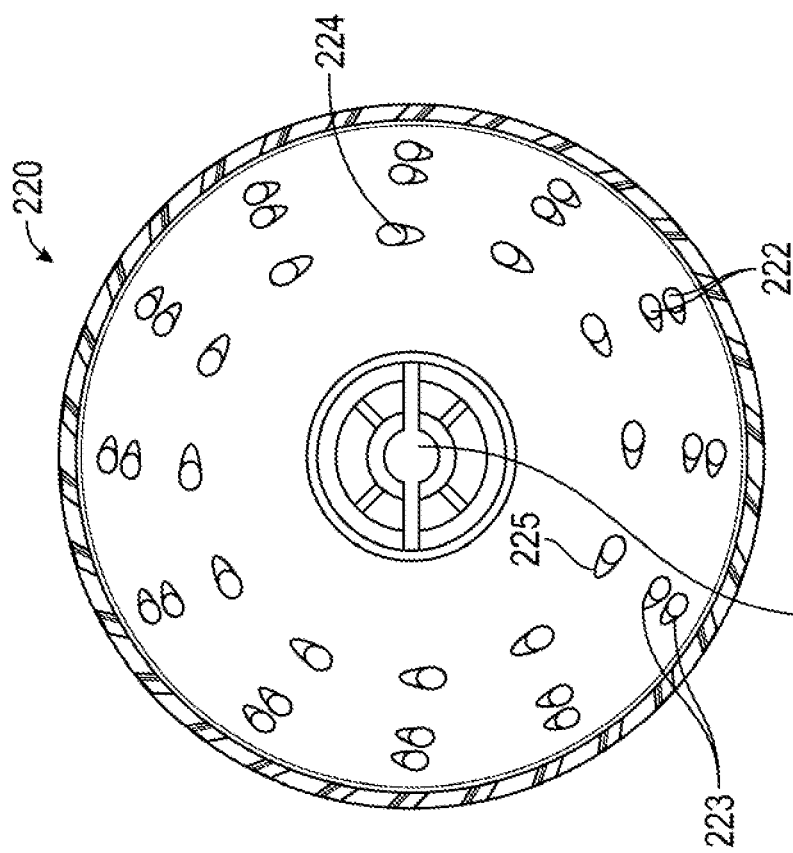
Figure 13:
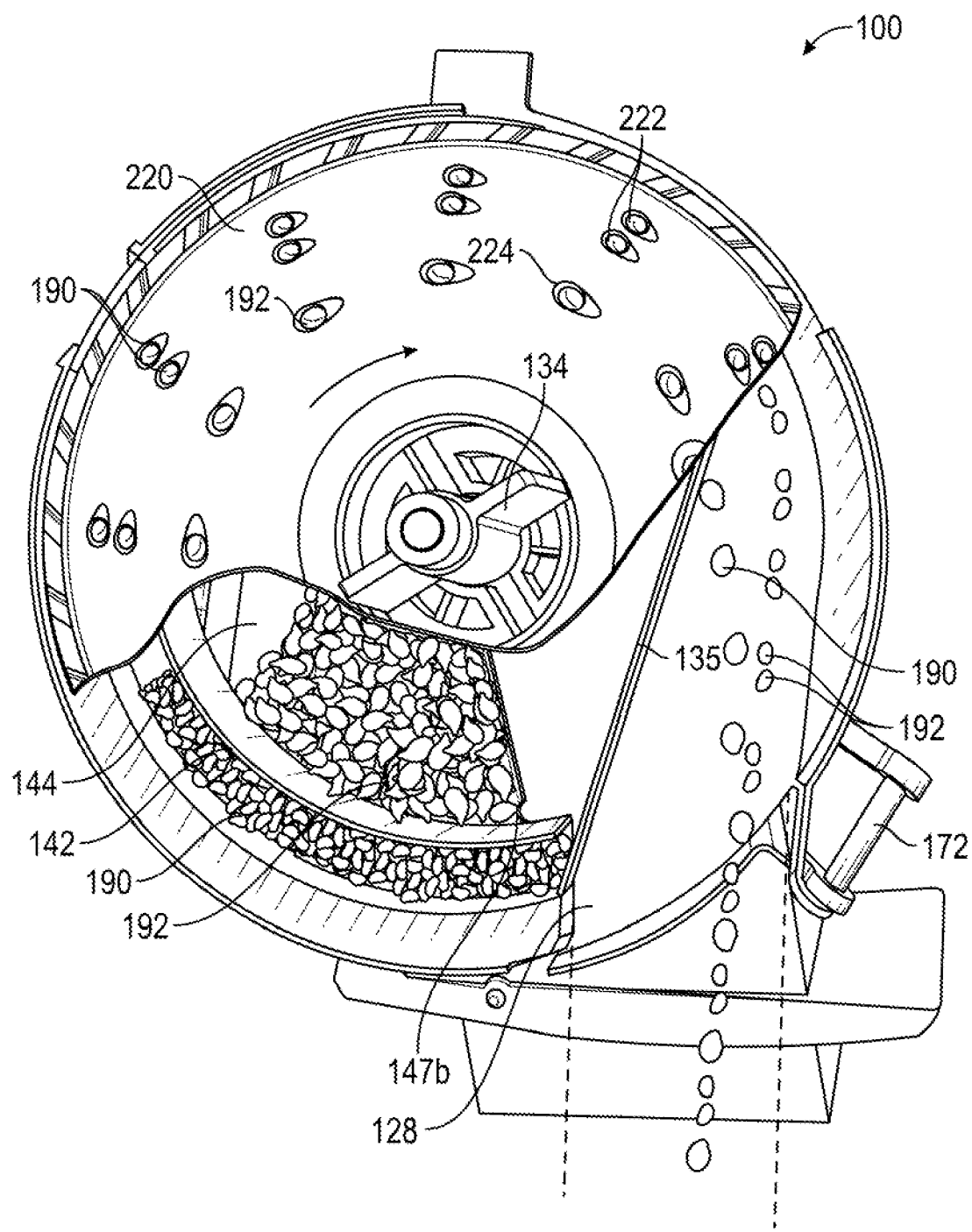
FIG. 13 illustrates a front view of a portion of the seed meter of FIG. 3 showing the first type seeds in the first seed pool area and the second type seeds in the second seed pool area therein which are picked up by the disk of FIGS. 12A and 12B and then released from the disk for discharge from the seed meter in accordance with another embodiment of present invention.

Now referring to FIGS. 12A and 12B, top and bottom perspective view, respectively of disk 220 are shown, in accordance with another embodiment of the present invention. In the current embodiment, disk 220 includes two rows of plurality of equally radially spaced first apertures 222, each having an indentation or concave cell 223. Further, disk 220 includes one row of plurality of equally radially spaced second apertures 224, each having an indentation or concave cell 225. In the current embodiment, two rows of first apertures 222 are disposed in alignment with first seed pool area 148 in back cover 120, as shown in FIG. 13. Similarly, second apertures 224 are disposed in alignment with second seed pool area 149 in seed separation device 140. Further, disk 220 includes keyed central aperture 226 configured to receive handle 134.

In the current embodiment, disk 220 mounts to back cover 120 including seed separation device 140, as shown in FIG. 13. Here, disk 220 allows to plant three different seeds, two (2) of one variety through two rows of first apertures 222 and one of other variety through one row of second apertures 224. For example, first type seeds 190 may include beans and second type seeds 192 may include cottonseeds. As such, disk 220 might be used in conjunction with seed separation device 140 to dispense two bean seeds through first apertures 222 and one cottonseed through second apertures 224, as can be seen in FIG. 13. Alternatively, two different types of cottonseeds, one (first type seeds 190) through first apertures 222 and other (second type seeds 192) through second apertures 224 might be entrained and then discharged. Further, two different types of bean seeds, i.e., one type of seeds (first type seeds 190) through first apertures 222 and other type (second type seeds 192) through second apertures 224 might be discharged.

As explained above, disk 220 rotates within the hollow interior of back cover 120. Vacuum source creates negative pressure or vacuum within vacuum chamber 180 resulting in pressure differential between seed-side face and vacuum side face of disk 220. It should be understood that the pressure differential will cause first type seeds 190 in first seed pool area 148 and second type seeds 192 in second seed pool area 149 (which is directly opposite the lower portion of vacuum chamber 180 on seed-side face 152 of disk 150) to entrain over first apertures 222 and second apertures 224, respectively on seed-side face of disk 220. First type seeds 190 and second type seeds 192 are entrained over first apertures 222 and second apertures 224 until they rotate past second segment 184 and negative pressure or pressure differential is cut off or removed. Once the pressure differential is removed, first type seeds 190 and second type seeds 192 free-fall under force of gravity from the face of disk 150 through discharge chute 128 and enter the seed tube (not shown). Further, first type seeds 190 and second type seeds 192 are directed downwardly and rearwardly through the seed tube until first type seeds 190 and second type seeds 192 are deposited into seed furrow (not shown).

The rate at which seeds are dispensed i.e., spacing of first type seeds 190 and second type seeds 192 (seed spacing) in the seed furrow can be configured using known art. In the present embodiment, two varieties of seeds are planted together in the same furrow. Spacing between two varieties of seed can be controlled from as low as 2 inches apart to as far as 2 feet apart.

In one alternate implementation, disk 220 might be provided in a different configuration, in which one row of first apertures 222 might be disposed in alignment with first seed pool area 148 and two rows of second apertures 224 might be disposed in alignment with second seed pool area 149. Such an implementation is employed to dispense two seeds of second type of seeds 192 for a single first type seed 190. For example, first type seeds 190 may include 1 herbicide tolerant seed, and second type seeds 192 may include 2 non herbicide tolerant, sacrificial seeds, both planted in a "hill" in the same furrow. This can be utilized to help emergence in certain crops by planting 3 seeds together but allowing the producer to terminate 2 of the seeds with herbicide after emergence. This allows the farmer to get better emergence by gaining additional pushing power by planting a higher population and terminating the sacrificial seeds to get the desired final population after emergence. The presently disclosed seed separation device 140 allows to plant 2 different varieties together in the same seed trench or together in a "hill" in the same seed trench.

As known "hill drop" is a popular style when planting cotton. Most farmers plant with 3 or 4 seeds in a "hill" to give the plant additional pushing power to help it come out of the ground. However, after emergence, 3 plants are not necessary in each hill and end up competing with each other and hurting yield. With presently disclosed seed meter 100, the farmer will be able to plant 1 herbicide tolerant seed, and 2 non herbicide tolerant, sacrificial seeds. By planting 1 herbicide resistant seed (primary seed) with 2 non herbicide resistant seeds (sacrificial seeds), the farmer can gain the benefits of the additional pushing power that the hill drop style gives and allows the farmer to terminate the 2 non herbicide resistant seeds with herbicide that the primary seed is tolerant to. This allows farmers to get better pushing power and more consistent stands while being able to terminate the additional 2 seeds in the hill. Additionally, this has an added benefit of reducing seeding cost versus traditional hill drop. Herbicide resistant (primary) seed is much more expensive than non-herbicide resistant (sacrificial seeds). This allows for two thirds of the seeding cost to be made up of more inexpensive seeds thus significantly reducing total seeding cost. The above principle can also be used in other crops such as soybeans.

As specified above, the seed separation device is removably mounted to the back cover. As such, the seed meter including seed separation device can be used for picking up different/multiple types of seeds by the disk and discharging them into the seed tube. Alternatively, a farmer can demount the seed separation device to use the seed meter as a conventional seed meter for metering seeds and then for dispensing a single seed with seed spacing. As such, the seed separation device described in the present invention can be used with existing seed meters or might be incorporated as a unique feature in a new seed meter. For example, the seed separation device can be used with known seed meters such as John Deere's "MaxEmerge vacuum seed meter" or "Pro-Series™ vacuum seed meter". Alternatively, the seed separation device, with some slight modification, be used with known seed meters such as "Precision Planting Eset" or "Precision Planting Vset" or "Kinze True Rate™ Vacuum Meter" or "Monesem NC Meter" or "Case Vset2 Meter" or "White 9000 Series Meter" or "Great Plains Air Pro Seed Meter" or any other existing/future seed meters.

Although the present invention is explained considering that the seed meter uses a vacuum (from vacuum source) on the vacuum-side face of the disk to create the necessary pressure differential, an alternative suitable operation may also be achieved by pressurizing the seed-side face of the disk. Further, the back cover, disk, and front cover can be optimized for different types of seeds so that when the type of seeds to be planted changes, it becomes relatively easy and fast operation to change the assemblies on the seed meter.

From the above, a person skilled in the art understands that the presently disclosed seed meter comprising a seed separation device allows to put/dispense two types of seed in the same furrow together in a hill drop style. With minor modifications to the seed separation device, two or three seeds of two different varieties can be closely aligned together in the seed furrow without having to change back and forth between varieties of seeds at different locations in the field. This allows a farmer to plant multiple crops at a time and improve crop yields.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure.

In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill. Hence, as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The subject matter set forth in the description is not intended to be limited to the embodiments shown herein, but is to be accorded the widest scope consistent with the principles and novel features disclosed herein. It is contemplated that additional embodiments are within the spirit and true scope of the disclosed subject matter.

What is claimed is:

1. A seed meter for planting different seed varieties, said seed meter comprising:
    a back cover comprising a first seed inlet chute and a seed discharge chute;
    a front cover;
    a seed separation device comprising a wall, said wall extending perpendicularly from said seed separation device and at a distance from the edge of said seed separation device, and wherein said seed separation device comprises a second seed inlet chute; and
    a disk comprising first apertures and second apertures radially aligned and disposed in two rows,
    wherein said back cover connects to said front cover, wherein said seed separation device connects to said back cover such that said second seed inlet chute inserts into said first seed inlet chute for creating a first seed pool area between said wall and said back cover and a second seed pool area at inner side of said wall via said second seed inlet chute,
    wherein said back cover connects to a seed hopper, wherein said seed hopper stores and dispenses first type of seeds into said first seed pool area and second type of seeds into said seed pool area,
    wherein said disk aligns with said seed separation device such that said first apertures align with said first seed pool area and said second apertures align with said second seed pool area,
    wherein said disk rotates under vacuum pressure and entrains said first type of seeds through said first apertures from said first seed pool area and said second type of seeds through said second apertures from said second seed pool area until said first apertures and said second apertures rotate past an area where the vacuum pressure cuts off, and
    wherein said first type of seeds and said second type of seeds free fall from said disk through said seed discharge chute.

2. The seed meter of claim 1, wherein said wall comprises holes to distribute the vacuum pressure created in said seed separation device.

3. The seed meter of claim 1, wherein said seed hopper comprises a first seed chamber storing the first type of seeds and a second seed chamber storing the second type of seeds.

4. The seed meter of claim 3, wherein said seed hopper comprises a separation plate separating said first seed chamber and said second seed chamber.

5. The seed meter of claim 1, wherein each of said first apertures and said second apertures comprises a concave cell for receiving respective first type of seed and second type of seed.

6. The seed meter of claim 1, wherein said first apertures have diameter equal to or greater than said second apertures.

7. The seed meter of claim 1, wherein said back cover comprises an isolation brush for separating said second seed pool area and said seed discharge chute.

8. A seed meter for planting different seed varieties, said seed meter comprising:
    a back cover comprising a first seed inlet chute and a seed discharge chute;
    a front cover;
    a seed separation device comprising a wall, said wall extending perpendicularly from said seed separation device and at a distance from the edge of said seed separation device, and wherein said seed separation device comprises a second seed inlet chute; and
    a disk comprising two rows of first apertures and one row of second apertures,
    wherein said back cover connects to said front cover, wherein said seed separation device connects to said back cover such that said second seed inlet chute inserts into said first seed inlet chute for creating a first seed pool area between said wall and said back cover and a second seed pool area at inner side of said wall via said second seed inlet chute,
    wherein said back cover connects to a seed hopper, wherein said seed hopper stores and dispenses first type of seeds into said first seed pool area and second type of seeds into said seed pool area,
    wherein said disk aligns with said seed separation device such that said first apertures align with said first seed pool area and said second apertures align with said second seed pool area,
    wherein said disk rotates under vacuum pressure and entrains said first type of seeds through said first apertures from said first seed pool area and said second type of seeds through said second apertures from said second seed pool area until said first apertures and said second apertures rotate past an area where the vacuum pressure cuts off, and
    wherein said first type of seeds and said second type of seeds free fall from said disk through said seed discharge chute.

9. The seed meter of claim 8, wherein said wall comprises holes to distribute the vacuum pressure created in said seed separation device.

10. The seed meter of claim 8, wherein said seed hopper comprises a first seed chamber storing the first type of seeds and a second seed chamber storing the second type of seeds.

11. The seed meter of claim 10, wherein said seed hopper comprises a separation plate separating said first seed chamber and said second seed chamber.

12. The seed meter of claim 8, wherein each of said first apertures and said second apertures comprises a concave cell for receiving respective first type of seed and second type of seed.

13. The seed meter of claim 8, wherein said first apertures have diameter equal to or greater than said second apertures.

14. The seed meter of claim 8, wherein said back cover comprises an isolation brush for separating said second seed pool area and said seed discharge chute.

15. A method of providing a seed meter for planting different seed varieties, said method comprising steps of:
    providing a back cover having a first seed inlet chute and a seed discharge chute;
    providing a front cover;
    providing a seed separation device comprising a wall, said wall extending perpendicularly from said seed separation device and at a distance from the edge of said seed separation device, said seed separation device comprising a second seed inlet chute;
    providing a disk comprising first apertures and second apertures radially aligned and disposed in two rows;
    connecting said back cover to said front cover;
    connecting said seed separation device to said back cover such that said second seed inlet chute inserts into said first seed inlet chute for creating a first seed pool area between said wall and said back cover and a second seed pool area at inner side of said wall via said second seed inlet chute;

connecting said back cover to a seed hopper, said seed hopper storing and dispensing first type of seeds into said first seed pool area and second type of seeds into said seed pool area;

aligning said disk with said seed separation device such that said first apertures align with said first seed pool area and said second apertures align with second seed pool area;

rotating said disk under vacuum pressure to entrain said first type of seeds through said first apertures from said first seed pool area and said second type of seeds through said second apertures from said second seed pool area until said first apertures and said second apertures rotate past an area where the vacuum pressure cuts off; and allowing said first type of seeds and said second type of seeds to free fall from said disk through said seed discharge chute.

16. The method of claim 15, further comprising providing a first seed chamber storing the first type of seeds and a second seed chamber storing the second type of seeds in said seed hopper.

17. The method of claim 16, further comprising providing a separation plate for separating said first seed chamber and said second seed chamber.

18. The method of claim 15, further comprising providing a concave cell for receiving said first type of seeds and said second type of seeds in each of said first apertures and said second apertures.

19. The method of claim 15, further comprising providing said first apertures having diameter equal to or greater than said second apertures.

20. The method of claim 15, further comprising providing an isolation brush for separating said second seed pool area and said seed discharge chute.

* * * * *